United States Patent
Zheng et al.

(10) Patent No.: US 9,985,502 B2
(45) Date of Patent: May 29, 2018

(54) REDUCING HIGH FREQUENCY LOSSES IN AN ELECTRIC MACHINE

(71) Applicant: Calnetix Technologies LLC, Cerritos, CA (US)

(72) Inventors: Liping Zheng, Buena Park, CA (US); Patrick McMullen, Villa Park, CA (US)

(73) Assignee: Calnetix Technologies, LLC, Cerritos, CA (US)

( * ) Notice: Subject to any disclaimer, the term of this patent is extended or adjusted under 35 U.S.C. 154(b) by 248 days.

(21) Appl. No.: 14/731,149

(22) Filed: Jun. 4, 2015

(65) Prior Publication Data

US 2016/0359394 A1    Dec. 8, 2016

(51) Int. Cl.
*H02K 3/42* (2006.01)
*H02K 11/01* (2016.01)
*H02K 1/27* (2006.01)

(52) U.S. Cl.
CPC ............. *H02K 11/01* (2016.01); *H02K 1/278* (2013.01)

(58) Field of Classification Search
CPC .......... H02K 1/28; H02K 1/265; H02K 1/278; H02K 1/27; H02K 11/01; H02K 3/42
USPC .... 310/156.28, 156.29, 156.31, 156.23, 214, 310/215
See application file for complete search history.

(56) References Cited

U.S. PATENT DOCUMENTS

| | | | | |
|---|---|---|---|---|
| 5,136,195 A | * | 8/1992 | Allen, III | H02K 11/042 310/68 D |
| 5,166,569 A | * | 11/1992 | Shervington | H02K 1/28 310/214 |
| 5,315,197 A | | 5/1994 | Meeks et al. | |
| 5,323,080 A | * | 6/1994 | Shahamat | H02K 1/28 310/180 |
| 5,514,924 A | | 5/1996 | McMullen et al. | |
| 5,691,589 A | * | 11/1997 | Keim | H02K 1/2786 29/596 |
| 6,071,092 A | | 6/2000 | Casaro et al. | |
| 6,483,219 B2 | * | 11/2002 | Nikolic | H02K 31/00 310/178 |
| 6,700,258 B2 | | 3/2004 | McMullen | |
| 6,727,617 B2 | | 4/2004 | McMullen | |
| 6,897,587 B1 | | 5/2005 | McMullen | |
| 7,042,118 B2 | | 5/2006 | McMullen | |
| 7,942,646 B2 | | 5/2011 | Zhou et al. | |

(Continued)

OTHER PUBLICATIONS

U.S. Appl. No. 14/278,988, filed May 15, 2014, McMullen.
U.S. Appl. No. 14/657,569, filed Mar. 13, 2015, Artinian et al.

*Primary Examiner* — Forrest M Phillips
(74) *Attorney, Agent, or Firm* — Fish & Richardson P.C.

(57) ABSTRACT

An electric machine has a stator defining an interior cavity and a rotor supported to rotate in the interior cavity of the stator. The rotor has a rotor core with a plurality of permanent magnets arranged around a perimeter of the rotor core. The magnets define a cylindrical, radially facing outer surface. An electrically conductive shield is provided on and covering the cylindrical outer surface of the permanent magnets. A containment sleeve resides around the rotor core, the permanent magnets and the shield and defines an exterior cylindrical surface of the rotor. The containment sleeve is configured to retain the magnets to the rotor core during operation of the electric machine.

19 Claims, 2 Drawing Sheets

(56) References Cited

U.S. PATENT DOCUMENTS

| | | | | |
|---|---|---|---|---|
| 8,018,114 B2* | 9/2011 | Rasmussen | ............ | H02K 3/487 |
| | | | | 310/156.28 |
| 8,084,902 B2* | 12/2011 | Lemmers, Jr. | ........... | H02K 1/22 |
| | | | | 310/270 |
| 8,723,358 B2 | 5/2014 | McMullen | | |
| 8,896,251 B2 | 11/2014 | Le et al. | | |
| 9,130,426 B2* | 9/2015 | Song | ...................... | H02K 1/278 |
| 2008/0143208 A1* | 6/2008 | Zhang | ...................... | H02K 1/24 |
| | | | | 310/179 |
| 2010/0109491 A1* | 5/2010 | Miyazaki | ................. | G01B 7/30 |
| | | | | 310/68 B |
| 2015/0236575 A1* | 8/2015 | Walsh | .................... | H02K 21/46 |
| | | | | 310/156.07 |
| 2015/0333584 A1* | 11/2015 | McMullen | ............... | H02K 1/28 |
| | | | | 310/156.28 |

\* cited by examiner

REDUCING HIGH FREQUENCY LOSSES IN AN ELECTRIC MACHINE

BACKGROUND

Rotor losses in permanent magnet electric machines are caused by power electronics switching harmonics imposed on the stator windings, and in turn, on the electrically conductive materials of the rotor. These very high-frequency harmonics cause eddy currents in the rotor, and thus $I^2R$ (current squared×resistance) losses. Reducing rotor losses in high-speed permanent magnet motors becomes more challenging as the rotating speed and switching frequency increase.

Removing rotor losses has always been an issue, as the only effective methods are conduction to the bearings and mass of the rest of the rotor and convection to airflow through the machine air gap. Neither are good at removing a significant amount of loss from the rotor. Segmentation of the rotor magnets can help to reduce rotor losses at relatively low switching frequencies. However, such segmentation is impractical for high switching frequency, high-speed machines, as the degree of segmentation necessary to gain appreciable improvements in losses detracts substantially from the magnet fill factor of the rotor.

DESCRIPTION OF DRAWINGS

Like reference symbols in the various drawings indicate like elements.

DETAILED DESCRIPTION

Figure 1:
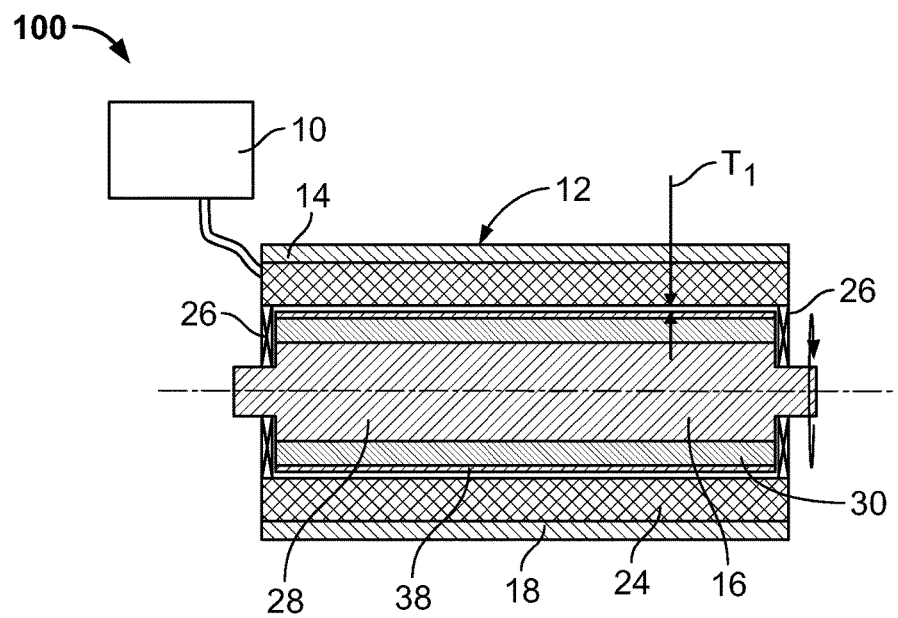
FIG. 1 is a half, side cross-sectional view of an example electric machine system in accordance with the concepts herein.

FIG. 1 is a half, side cross-sectional view of an example electric machine system 100 in accordance with the concepts herein. The system 100 includes an electric machine 12 and a power electronics module 10. The electric machine 12 includes a stator 14 and a permanent magnet rotor 16. In certain instances, the electric machine system 100 can operate as a motor, a generator and/or both. In the context of a motor, the rotor 16 can be coupled to a load that is driven by the electric machine 12. In the context of a generator, the rotor 16 can be coupled to a driver that drives the rotor 16 to rotate in the stator 14 and generate electricity. The electric machine 12, in certain instances, can be characterized as a high power, high speed machine.

Figure 2:
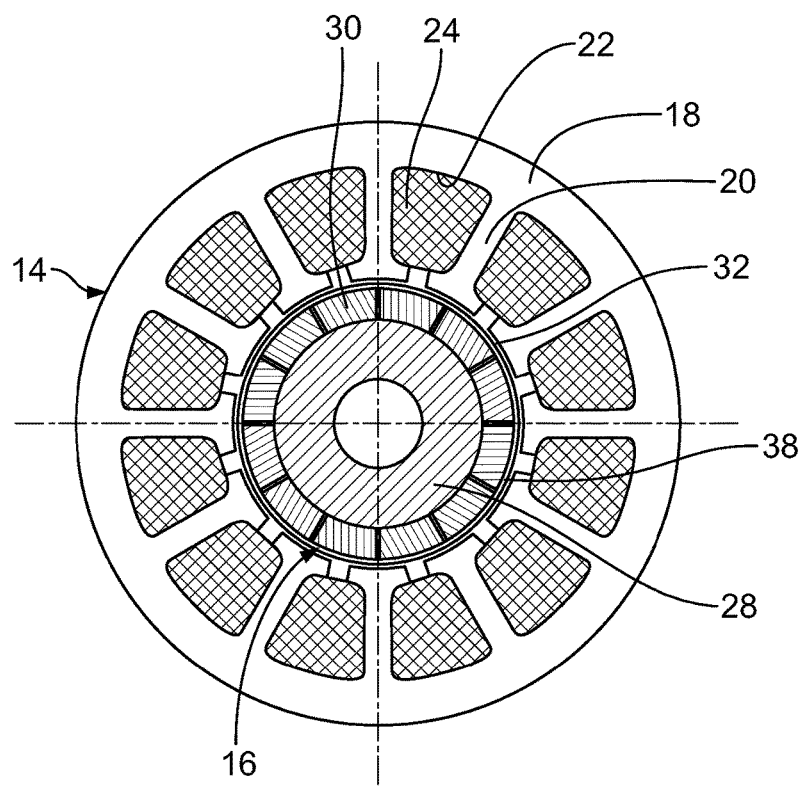
FIG. 2. is a half, end cross-sectional view of an example electric machine in accordance with the concepts herein.

The stator 14 is generally cylindrical, defining an interior cavity through its center that internally receives the permanent magnet rotor 16. As best seen in FIG. 2, the stator 14 has a stator core 18 with a plurality of radially inwardly extending ribs or teeth 20 running the axial length of the stator core 18. Adjacent teeth 20 define axial slots 22 therebetween. In certain instances, the stator core 18 is constructed of a plurality of axially stacked conductive laminations bonded together with a resin and/or other polymer adhesive, welded, or joined by another method. In certain instances, the laminations are silicon electrical steel that is specially alloyed to produce favorable magnetic properties, such as a small hysteresis area and high magnetic permeability. The stator core 18 carries multiple coils of conductors or wire coiled around the teeth 20 of the stator core 18 and residing in the slots 22. The coils are interconnected to define multiple sets of windings 24. The windings 24 are distributed circumferentially around the stator core 18. For example, in an instance where the electric machine 12 is a three phase machine, it has three sets of windings 24 (one for each phase) distributed circumferentially around the stator core 18. The electric machine 12 can have fewer or more phases, and thus, fewer or more sets of windings 24. The windings 24 are electrically connected to the power electronics module 10.

The rotor 16 is supported (e.g., by bearings 26 and/or otherwise) to rotate in the interior cavity of the stator 14. The rotor 16 has a rotor core 28 with a plurality of permanent magnets 30 fixed around the perimeter of the core 28. The rotor core 28 can be formed from a solid, single piece of material (e.g., magnetic metal) or another construction. In certain instances, the permanent magnets 30 are rare earth magnets. The polarity of the magnets 30 is oriented to define alternating opposing pole pairs. In certain instances, the number of pole pairs of the rotor 16 is fewer than the number of coil pairs of the windings 24.

Referring back to FIG. 2, the magnets 30 are circumferentially arranged around the rotor core 28 and arranged to define a cylindrial surface. A non-magnetic, and in certain instances non-metallic, cylindrical containment sleeve 38 is placed around the permanent magnets 30 to retain the permanent magnets 30 to the rotor core 28. The containment sleeve 38 defines the exterior cylindrical surface of the rotor 14. An electrically conductive shield 42 (best seen in FIG. 3) is provided at least between the permanent magnets 30 and the sleeve 38, and in some instances between the magnets 30 themselves. The shield 42 is provided to filter the high-frequency harmonics imposed on the rotor 16, via the stator 14, by the power electronics switching harmonics. High frequency fields generated by the harmonics generate eddy current losses in electrically conductive parts of the rotor, including the permanent magnets 30. Having the conductive shield 42 between the stator 14 and the magnets 30 results in eddy currents at the surface of the rotor 16 that inhibit transmission of the high frequency fields of the harmonics into the magnets 30, thus localizing the losses substantially in the surface of the rotor 16. The high conductivity of the shield 42 allows eddy currents to generate opposing fields to those being applied by the high frequency field harmonics, thus reducing the overall losses in the rotor 16. By localizing and reducing the losses at the surface of the rotor 16, the heat generated by the rotor losses is reduced and is easier to conduct out of the rotor 16.

Figure 3:
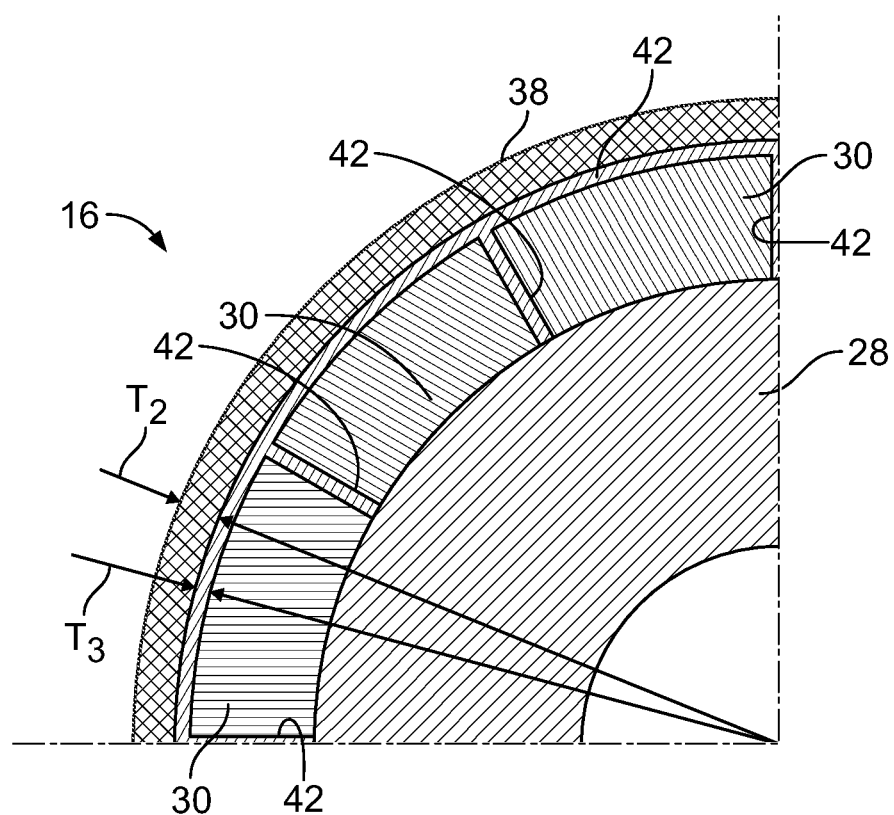
FIG. 3 is a quarter, end cross-sectional detail view of an example rotor for the electric machine of FIG. 1.

FIG. 3 shows a partial cross-sectional view of the rotor 16 having a shield 42 arranged in continuous contact and covering the outer circumferential surface of the permanent magnets 30. In certain instances, the shield 42 extends the entire axial length of the permanent magnets 30, so that the entire radially facing surface of the magnets 30 is covered by the shield 42. The shield 42 can be in the form of a cylindrical tube positioned over the magnets 30, a metallic foil applied to the outer surface of the magnets, or a coating (e.g., paint) applied to the surface of the magnets 30. Other configurations of the shield 42 are contemplated. In certain instances, the shield 42 can extend radially between the magnet segments 30. In doing so, the shield 42 can be configured to contact the surface of the rotor core 28 to help conduct heat from the shield 42 into the core and, thus, out of the rotor 16.

In certain instances, the permanent magnets 30 are initially bonded, affixed with fasteners, and/or held with clamps or otherwise held permanently or temporarily to the rotor core 28. Once installed to the rotor core 28, the assembly of magnets 30 may be shaped to provide or improve the continuous surface of the magnets 30 with a smooth, constant radius surface around its entire perimeter. In certain instances, the outer perimeter surface of the magnets 30 can be ground to a smooth, uniform circumferential surface. Thereafter, the electrically conductive shield 42 can be applied to the outer circumferential surface of the magnets 30. Alternatively, magnets 30 can be pre-shaped and the material of the conductive shield 42 can be applied to the magnets 30 before the magnets are joined to the rotor core 28.

The electrically conductive shield 42 can be one or combination of different materials. Notably, though, the greater the electrical conductivity of the shield 42, the more effective the material 42 is at filtering the high-frequency harmonics from entering the material of the permanent magnets 30. In certain instances, the material of the shield 42 has an electrical conductivity of $4.00 \times 10^7$ siemens/meter (S/m) or greater at 20° C. In certain instances, the material of the shield 42 is copper ($5.80 \times 10^7$ S/m at 20° C.) or a copper alloy. Since the shield 42 is not intended to structurally retain the magnets 30 to the rotor core 28, there is greater freedom to choose a material based on its electrical conductivity rather than its strength.

Typically, the maximum radial thickness of the shield 42 (T3 in FIG. 3) radially over the permanent magnets 30 will be much thinner than the minimum radial thickness of the containment sleeve 38 (T2 in FIG. 3) over the permanent magnets 30, as well as the maximum radial air gap 32 between the rotor 16 and the stator 18 (T1 in FIG. 1) over the permanent magnets 30. For example, dimension T3 is often less than 20% of dimension T2.

In certain instances, the securement of the magnets 30 to the core 28 described above (i.e., the adhesive, fasteners or clamps) provides only nominal support to retain the magnets 30, and the permanent magnets 30 are primarily retained to the rotor core 28 by the containment sleeve 38. In such an instance, the containment sleeve 38 is sized and its material properties are such that the sleeve 38 can support all or nearly all of the forces associated with retaining the magnets 30 at all operating speeds of the electric machine 12. In other instances, the bonding or other fixing mentioned above can contribute to retaining the permanent magnets 30 to the rotor core 28. The sleeve 38 can be applied in tension, configured to produce a specified compressive stress on the permanent magnets 30, such that as the rotor 16 rotates, the force from the compressive stress is subtractive from the centrifugal force of the rotating magnets 30. In certain instances, the containment sleeve 38 is a fiber reinforced plastic. For example, the sleeve 38 can be laid up in one or more layers around the permanent magnets 30. Some examples of materials for the sleeve 38 include carbon fiber composite, aramid fiber composite, fiberglass and/or other materials. The sleeve 38 is preferably very thin, so as to minimize the non-magnetic space (i.e., "air gap") between the windings 24 and the permanent magnets 30.

In operation, the power electronics module 10 can be configured to receive AC and/or DC electricity, depending on the application. The module 10 then performs switching to produce the necessary waveform in the windings 24 to drive the rotor 16 to rotate. In certain instances, the power electronics module 10 and electric machine 12 are adapted to operate on 25 kW (kilowatts) of electricity and drive the rotor at speeds of 25,000 rpm (rotations per minute) or greater.

In view of the above, certain aspects encompass an electric machine that has a stator defining an interior cavity and a rotor supported to rotate in the interior cavity of the stator. The rotor has a rotor core with a plurality of permanent magnets arranged around a perimeter of the rotor core. The magnets define a cylindrical, radially facing outer surface. An electrically conductive shield is provided on and covering the cylindrical outer surface of the permanent magnets. A containment sleeve resides around the rotor core, the permanent magnets and the shield and defines an exterior cylindrical surface of the rotor. The containment sleeve is configured to retain the magnets to the rotor core during operation of the electric machine.

Certain aspects encompass a method of operating an electric machine where a rotor is rotated in an interior cavity of a stator using an electromagnetic field generated in the stator and acting on a magnetic field generated by permanent magnets of the rotor. Harmonics of the electromagnetic field are filtered against substantial entrance into the permanent magnets by an electrically conductive shield covering a cylindrical outer surface of the magnets.

Certain aspects encompass a permanent magnet rotor for an electric machine. The rotor includes a rotor core and a plurality of permanent magnets arranged around a perimeter of the rotor core. A containment sleeve retains the permanent magnets to the rotor core, and an electrically conductive shield resides between the containment sleeve and the permanent magnets.

The aspects above can include one or more of these optional additional features. In certain instances, the electrically conductive shield can be copper or a copper alloy. In certain instances, the electrically conductive shield can have an electrical conductivity of $4.00 \times 10^7$ S/m or greater. The shield can be configured as a tube. The shield can be a foil applied over the permanent magnets. The shield can be a coating applied to a surface of the permanent magnets. The shield can reside in between the magnets and contact the rotor core. The shield can cover the entire radially facing surface of the permanent magnets. The shield can be thinner than the containment sleeve and thinner than the air gap. In some instances, the maximum radial thickness of the shield can be less than 20% of the minimum radial thickness of the containment sleeve.

A number of embodiments have been described. Nevertheless, it will be understood that various modifications may be made. Accordingly, other embodiments are within the scope of the following claims.

What is claimed is:
1. An electric machine, comprising:
a stator defining an interior cavity; and
a rotor supported to rotate in the interior cavity of the stator, the rotor comprising:
 a rotor core;
 a plurality of permanent magnets arranged around a perimeter of the rotor core and the permanent magnets defining a cylindrical, radially facing outer surface;
 an electrically conductive shield on and covering the cylindrical outer surface of the permanent magnets, where the electrically conductive shield covers the entire radially facing surface of the plurality of permanent magnets; and
 a containment sleeve around the rotor core, the permanent magnets and the shield and the containment sleeve defining an exterior cylindrical surface of the rotor, the containment sleeve configured to retain the magnets to the rotor core during operation of the electric machine.

2. The electric machine of claim 1, where the electrically conductive shield comprises copper or a copper alloy.

3. The electric machine of claim 1, where the electrically conductive shield comprises a metallic layer residing over the plurality of permanent magnets.

4. The electric machine of claim 1, where the electrically conductive shield comprises a metallic foil applied over the permanent magnets.

5. The electric machine of claim 1, where the electrically conductive shield comprise a metallic coating applied on the radially facing surface of the permanent magnets.

6. The electric machine of claim 1, where the electrically conductive shield resides between the permanent magnets and in contact with the rotor core.

7. The electric machine of claim 1, where the maximum radial thickness of the shield is less than the minimum radial thickness of the containment sleeve and less than the maximum radial thickness of the air gap.

8. The electric machine of claim 1, where the maximum radial thickness of the shield is less than 20% the minimum radial thickness of the containment sleeve.

9. The electric machine of claim 1, where the shield comprises a material having an electrical conductivity of $4.00 \times 107$ siemens/meter (S/m) or greater.

10. A method of operating an electric machine, comprising:
    rotating a rotor in an interior cavity of a stator using an electromagnetic field generated in the stator, acting on a magnetic field generated by permanent magnets of the rotor; and
    filtering harmonics in the electromagnetic field of the stator using an electrically conductive shield covering a cylindrical outer surface of the permanent magnets, where the electrically conductive shield covers the entire radially facing surface of the plurality of permanent magnets.

11. The method of claim 10, where the electrically conductive shield comprises a material having an electrical conductivity of $4.00 \times 107$ S/m or greater.

12. The method of claim 10, comprising retaining the permanent magnets to a core of the rotor with a non-conductive containment sleeve.

13. The method of claim 10, where the rotor and stator are substantially cylindrical and filtering harmonics using an electrically conductive shield comprises filtering harmonics using an electrically conductive shield having a maximum radial thickness that is 20% or less than the minimum radial thickness of the non-conductive containment sleeve.

14. The method of claim 10, where filtering harmonics using an electrically conductive shield comprises filtering harmonics using an electrically conductive shield comprising a metallic foil.

15. The method of claim 10, where filtering harmonics using an electrically conductive shield comprises filtering harmonics using an electrically conductive shield comprising a coating applied to a surface of the permanent magnets.

16. The method of claim 10, where filtering harmonics using an electrically conductive shield comprises filtering harmonics using an electrically conductive shield comprising copper.

17. A permanent magnet rotor for an electric machine, comprising:
    a rotor core;
    a plurality of permanent magnets arranged around a perimeter of the rotor core;
    a containment sleeve retaining the permanent magnets to the rotor core; and
    an electrically conductive shield between the containment sleeve and the permanent magnets, where the electrically conductive shield covers the entire radially facing surface of the plurality of permanent magnets.

18. The permanent magnet rotor of claim 17, where the electrically conductive shield comprises a material with an electrical conductivity of $4.00 \times 107$ S/m or greater.

19. The permanent magnet rotor of claim 17, where the rotor is substantially cylindrical and the electrically conductive shield has a maximum radial thickness that is less than 20% the minimum radial thickness of the containment sleeve.

* * * * *

UNITED STATES PATENT AND TRADEMARK OFFICE
CERTIFICATE OF CORRECTION

Page 1 of 1

PATENT NO. : 9,985,502 B2
APPLICATION NO. : 14/731149
DATED : May 29, 2018
INVENTOR(S) : Liping Zheng and Patrick McMullen It is certified that error appears in the above-identified patent and that said Letters Patent is hereby corrected as shown below:

Column 5, Line 27, Claim 9, delete "4.00×107 S/m" and insert --4.00×$10^7$ S/m--.

Column 5, Line 42, Claim 11, delete "4.00×107 S/m" and insert --4.00×$10^7$ S/m--.

Column 6, Line 36, Claim 18, delete "4.00×107 S/m" and insert --4.00×$10^7$ S/m--.

Signed and Sealed this
Twenty-fifth Day of December, 2018

Andrei Iancu
*Director of the United States Patent and Trademark Office*